United States Patent Office 3,489,704
Patented Jan. 13, 1970

3,489,704
AQUEOUS COATING COMPOSITIONS FROM
BUTADIENE BASED ADDUCTS
Leroy A. Dunham and William J. Belanger, Louisville, Ky., assignors to Celanese Coatings Company, New York, N.Y., a corporation of Delaware
No Drawing. Filed Oct. 21, 1965, Ser. No. 500,234
Int. Cl. C08d 9/02
U.S. Cl. 260—23.7         5 Claims

ABSTRACT OF THE DISCLOSURE

Resinous compositions are made by adducting (a) fumaric acid with a mixture of (b) an unsaturated fatty acid or fatty oil and (c) a polymer or copolymer of butadiene. The resinous compositions are useful as coating compositions, particularly when salted with an amine and dissolved in water.

---

This invention relates to resinous compositions which are the coreaction products of unsaturated polymeric compounds, unsaturated fatty compounds and fumaric acid. Particularly, the present invention pertains to resinous compositions which are prepared by coreacting polymers and copolymers of butadiene, unsaturated fatty acids and unsaturated fatty oils, and fumaric acid. In another aspect, the invention relates to aqueous solutions of the resinous compositions and to the use of the aqueous solutions as coatings.

Polymers and copolymers of butadiene are film forming compositions and have found considerable use as surface coatings. These polymers are used in special applications, such as can linings and thin clear coatings. However, as pointed out in U.S. Patent 2,652,342, the polymers have disadvantages when used in enamel formulations in that they do not properly wet the pigments. The resulting enamels are dull and streaky in appearance. This disadvantage has been overcome in the aforementioned patent by reacting the butadiene polymer with a small amount of maleic anhydride, 0.05 percent to about 2.5 weight percent based on the weight of the polymer. Maleic anhydride modified butadiene polymers have uniformly excellent pigment wetting powers which result in enamels of uniformly excellent gloss. However, as pointed out in the aforementioned patent, butadiene polymers which contain more than 2.5% maleic anhydride are so slow drying as to be useless for all practical considerations, unless still further treated or specially compounded. One method of treating a high maleic anhydride containing polymer is to add to the polymer sufficient drying oil to reduce the average maleic anhydride content of the mixture below 1%.

Butadiene polymers and copolymers which contain small levels of maleic anhydride modification (2.5% or lower) are not soluble in aqueous systems, i.e., they are not soluble in ammonia or amine water. Furthermore, blends of more highly modified polymers with drying oils do not produce homogeneous aqueous solutions that can be used in coating formulations.

In recent years, aqueous coating systems have gained wide acceptance in the coatings industry. Water is a non-flammable non-toxic readily available thinner. The use of water thinnable paints reduces fire hazards and toxicological problems in large industrial applications. When water thinned paints are used, water, rather than organic solvents, is released to the atmosphere. Such paints do not contribute to atmospheric contamination to the extent that organic solvent paint systems do. There is a need for aqueous coating systems which can be used in various industrial applications.

It has now been found that modified butadiene polymers and copolymers which are soluble in aqueous systems can be prepared by coreacting a butadiene polymer or a copolymer of butadiene and a vinyl aromatic compound, wherein the copolymer contains at least 75 weight percent polymerized butadiene, and an unsaturated fatty acid or unsaturated fatty oil with 5 to 15 weight percent fumaric acid based upon the total weight of the final composition. For the purposes of this invention, it is desirable to react about 40 to about 80 weight percent butadiene polymer or copolymer with about 15 to about 55 weight percent of the unsaturated fatty acid or oil and about 5 to about 15 weight percent fumaric acid. Such compositions are readily reducible in ammonia or amine water and can be formulated into coatings having excellent durability and resistance properties.

As has been stated hereinbefore, small amounts of maleic anhydride can be reacted with butadiene polymers. Attempts to react higher amounts of maleic anhydride (up to 15 percent) with butadiene polymers give uncontrollable and inconsistent results. In most instances, the maleic anhydride does not fully react or else the reaction mixture gels. Even when unsaturated fatty acids and fatty oils are used in admixture with the butadiene polymers, the reactants generally form gels when more than about 4 percent maleic anhydride is coreacted.

When fumaric acid is coreacted with butadiene polymers in admixture with unsaturated fatty acids or oils, the reaction is controllable, all the added fumaric acid will react and the reaction product remains soluble and fusible and is not gelled.

The unsaturated polymeric compounds useful in this invention are homopolymers of butadiene or copolymers of butadiene and a vinyl aromatic monomer, the copolymers having at least 75 weight percent butadiene content. The vinyl aromatic monomers are preferably styrene and styrene homologues such as vinyl toluene, dimethyl styrene and ethyl styrene. The useful butadiene polymers are liquid or semi-liquid compositions having viscosities of about 200 poises to about 3500 poises at 25° C. and molecular weights ranging from about 2000 to about 10,000. The butadiene polymeric compositions contain unsaturation and have iodine numbers ranging from about 275 to about 400.

Butadiene polymers and copolymers are prepared by well known sodium catalyzed polymerization reactions or they can be prepared by free radical catalysis of the monomers. Part of the butadiene monomer can be substituted with other diolefins, such as isoprene, 2,3-dimethyl butadiene, piperylene or 2-methyl pentadiene-1,3.

Unsaturated fatty compounds as used in this invention refer to unsaturated fatty oils or unsaturated fatty acids. Unsaturated fatty oils are naturally occurring triglycerides of unsaturated acids and have iodine values of about 100 to about 210. Such fatty oils include linseed oil, tall oil, cottonseed oil, perilla oil, soybean oil, safflower oil, sunflower oil, and the like. Additional fatty oils are of synthetic derivation, such as dehydrated castor oil and esters of unsaturated fatty acids with polyols, for instance trimethylol ethane, trimethylol propane and pentaerythritol. Mixtures of oils can also be used in this invention.

The unsaturated fatty acids are obtained by saponification of the naturally occurring triglycerides and are named from the oils from which they are derived. Such acids are mixtures of fatty acids having from about 12 to about 24 carbon atoms. Purified acids can also be used in this invention. Such acids are myristoleic acid, palmitoleic acid, oleic acid, linoleic acid, linolenic acid, eleostearic acid and the like. Mixtures of fatty acids and fatty oils have been found to be particularly useful in preparing the compositions of this invention.

Fumaric acid is the preferred unsaturated dicarboxylic acid for use in this invention. However, other dicarboxylic acids and anhydrides such as maleic acid, maleic anhydride, itaconic acid and citraconic anhydride, can be used in admixture with fumaric acid provided fumaric acid is the major component of the mixture.

Small amounts, up to about 25 percent of the total composition, of various modifying resins can be incorporated in the resinous compositions by coreacting these modifiers with the components hereinbefore described. Modifying resins include unsaturated hydrocarbon resins, which are polymers made from coal-tar distillates containing coumarone and indene, or petroleum distillates containing cyclopentadiene or piperylene. Additional modifying resins are phenolic resins, both heat reactive and non heat reactive types, and small amounts of polyepoxide resins.

The resinous compositions of this invention can be prepared by heating all of the components together at a temperature of about 350° F. to 450° F., preferably 390° F. to 425° F., until the fumaric acid has completely reacted with the other components. Generally, the reaction is completed within about 2 to 5 hours. An alternate method is to heat and mix the unsaturated fatty compound and the unsaturated polymeric compound to 300° F. The fumaric acid is then added and the temperature is raised to 350° F. to 450° F. to complete the reaction.

The completeness of reaction is determined by removing a sample of the reactants from the reactor and cooling the sample to room temperature. When the sample remains clear, the fumaric acid is all reacted.

The compositions of this invention are soluble in organic solvents, such as aliphatic hydrocarbons and aromatic hydrocarbons, esters, ethers, alcohols, and ether or ester alcohols. Excellent coatings can be prepared from such organic solutions. However, in a preferred embodiment of this invention, coatings are prepared from aqueous solutions of the resinous compositions. The resinous compositions of this invention contain carboxylic acid groups and have acid values ranging from about 50 to about 150. The acid groups are capable of reacting with ammonia or amines to form salts which in turn can be dissolved in water. The term "amine" as used herein is intended to mean both ammonia or an amine. By "aqueous solutions" is meant true solutions or colloidal dispersions or emulsions of the resinous compositions in water.

Examples of amines which can be used include ethyl amine, diethyl amine, triethyl amine, propyl amine, dipropylamine, tripropyl amine, butyl amine, dibutyl amine, tributyl amine, ethanol amine, propanol amine, diethanol amine, tripropanol amine, triethanol amine, 2-amino-2-methyl-1-propanol, morpholine, ethylene diamine, dimethyl aminopropyl amine and so forth.

The amines which can be used to react with the condensates can be water soluble or only partially water soluble. Triethyl amine is an example of a partially water soluble amine which can advantageously be used. The water solubility of triethyl amine at 20° C. is 5.5 percent.

Water insoluble amines can also be used in admixture with the water soluble or partially water soluble amines. Such water insoluble amines include polyamido-amines prepared by reatcing a mono- or poly basic acid with an aliphatic polyamine, wherein the amine groups are in excess over the acid groups. Useful polyamido-amines are made by reacting fatty acids with polyalkylene polyamines. Up to as high as 40 weight percent based upon the total weight of the amine mixture of water insoluble amine can be used in combination with water soluble or partially water soluble amines.

The amine salt of the resinous compositions of this invention can be formed by first dissolving the amine in water followed by slow addition of the resin. The amine and resin can also be added to the water simultaneously. It is preferred to heat the resin to about 250° F. to make it more fluid and to add it to the amine and water which has been heated to about 90° F. to about 110° F.

In some instances, the resinous composition is quite viscous and it is difficult to react it with the amine to form an aqueous solution. In such cases, it may be desirable to thin the resin with a small amount of organic solvent. Examples of such solvents are isopropyl alcohol, 3-methoxybutyl alcohol, 2-methoxy-ethanol, 2-ethoxyethanol, 2-butoxyethanol, dimethylformamide, etc.

The amine salts of the resinous composition of this invention are water-reducible resins being water soluble, water-dispersible or somewhere in between depending upon the acid value of the resin, the particular amine used to form the salt as well as the amount of amine used. It is important to use a type and amount of amine which will render the resinous composition sufficiently water soluble or water dispersible to prevent any significant amount of particle settling. Generally, the amount of amine used will be about 0.5 to about 1.5 equivalents of amine for each carboxylic acid group of the resinous composition, although amine equivalents as low as 0.25 can be used if emulsions rather than solutions are desired.

The type of amine used to form water soluble resinous compositions will depend somewhat upon the end use intended for the resin solution. It is desirable in most instances to remove the amine from the coating during the curing reaction. Thus, when the coating is to be cured at low temperatures, it is desirable to use low boiling amines so that they will be flashed out during the curing operation. With respect to coatings which are subjected to high temperature baking and curing operations, the boiling point of the amine is not as important since at least some of the high boiling amines will be flashed out during the cure. In addition, high boiling amines which are subjected to high temperature curing, particularly primary and secondary amines, can be tied into the coating through amide formation with the carboxylic acid groups in the resinous composition. If hydroxyl amines are used to solubilize the resinous composition, these can also react at high curing temperatures leading to increased crosslinking in the coating.

Coatings can be prepared from the aqueous solutions of the resinous composition amine salts using conventional techniques, such as spraying, roller coating, brushing, dip coating, and so forth. The aqueous coatings can also be used in electrophoretic processes wherein the solution is subjected to an electric current and the coating plates out on the cathode.

Solutions containing various percent solids can be used depending upon the results desired. Generally, solutions containing 25 to 50 percent solids are advisable and when these are applied to an appropriate substrate, the coatings can be air dried at ambient temperatures or they can be cured by heat. Excellent films have been obtained by heating the coatings between about 300° F. to 400° F. for between about 15 and 45 minutes. Driers can be used to obtain cures of the coatings, but they are not necessary in most instances.

Other water soluble resins can be incorporated into the water solutions of the resinous composition-amine salts to modify the properties of the coatings. Water soluble aminoplast resins, such as methylated methylol melamine have been found to be particularly advantageous and can be readily blended with the resin-amine solutions and cured. Various amounts of such aminoplast resins can be used depending upon the type coating desired. Generally, up to about 40 percent by weight and preferably 5 to 30 percent by weight of aminoplast resin can be used with 95 to 70 percent of the resinous composition of this invention.

Various pigments can be used in admixture with the resinous compositions of this invention as will be apparent to those skilled in the art. Such pigments include red iron oxides, magnesium silicates, basic lead silica chromate, lead oxide, clay, talc, barytes, carbon black, titanium dioxide, etc.

The resinous compositions of this invention are polyfunctional acids and can be used to cure epoxide resins. Useful epoxide resins are those which contain more than one vicinal epoxide group per molecule. Epoxide resins are well known compositions and are fully described in "Epoxy Resins" by Lee and Neville, McGraw-Hill Book Company, 1957.

The following examples serve to further illustrate the invention and describe in detail how the invention can best be practiced. Parts are by weight.

EXAMPLE 1

To a suitable reaction flask equipment with a mechanical stirrer, temperature recording device and condenser were added 1425 parts of a butadiene/styrene copolymer (80 parts of butadiene and 20 parts of styrene) having a viscosity of 3500 poises at 25° C. and an iodine number of 300, 950 parts of tall oil fatty acids and 125 parts of fumaric acid. Heat was applied to the flask raising the temperature of the reactants to 400° F. The temperature was held at 400° F. for 1 hour and 20 minutes and was then raised to 420° F. where it was held at 420° F. for 3 hours and 45 minutes. At the end of this heating period, a small sample of the reactants was withdrawn and was cooled to room temperature. The sample remained clear indicating complete reaction of the fumaric acid. The reaction product had an acid value of 105.5, a density of 7.86 lbs./gallon at 25° C., and a Gardner-Holdt viscosity at 25° C. of $Z_6$ to $Z_7$ at 60 percent solids in a highly aromatic hydrocarbon solvent having a boiling range of 313° F. to 398° F. and a minimum flash point of 100° F.

320 parts of the resinous reaction product were heated to 250° F. and were added to a solution of 430 parts of water and 50 parts of diethyl amine heated to 100° F. After holding the temperature at 155° F. for 30 minutes, a clear solution was obtained. The solution had a Gardner-Holdt viscosity at 25° C. of Z, a density of 8.14 lbs./gallon at 25° C., and a pH of 9.8.

Films were prepared from the aqueous solutions on zinc phosphate treated steel panels and on tin plated steel panels using a 3 mil drawdown blade. Films were also prepared on test tubes by dipping the closed ends of the test tubes in the aqueous solutions. The films were cured by baking them at 350° F. for 20 minutes. The films on the test tubes were suspended in a 3 percent caustic solution (aqueous). The films were not affected by the caustic at the end of hours soaking, but were slightly lifted from the glass after 8 hours. The films on tin plated panels had a pencil hardness of HB and after being suspended in boiling water for 8 hours, they had a pencil hardness of F. The films on the phosphate treated panels passed a direct bump test of 40 inch-pounds and an indirect bump test of 10 inch-pounds.

EXAMPLE 2

To a reaction flask equipped as described in Example 1 were added 1762 parts of a butadiene/styrene copolymer (80 parts butadiene and 20 parts styrene) having a viscosity at 25° C. of 3500 poises and an iodine number of 300, 613 parts of tall oil fatty acids and 125 parts of fumaric acid. The reactants were heated at 420° F. for 6 hours, after which heating period a small sample of the reaction product was removed from the flask and was cooled to room temperature. The sample remained clear indicating complete reaction of the fumaric acid. The reaction product had an acid value of 79.2 and a density at 25° C. of 7.8 lbs./gallon.

600 parts of the resinous reaction product was heated to 250° F. and was added to a solution of 827 parts of water and 73 parts of diethyl amine heated to 100° F. After holding the temperature at 150° F. for 30 minutes, a clear solution was obtained. The solution had a Gardner-Holdt viscosity of N–O at 25° C., a pH of 9.8 and a density at 25° C. of 8.16 lbs./gallon. Films were prepared from these solutions using the procedures as was described in Example 1. The films on the test tubes exhibited a slight wrinkling after 3 hours soaking in 3 percent caustic solution. The films on tin plated panels had a pencil hardness of HB and after 8 hours in boiling water had a pencil hardness of HB. Films on phosphate treated panels passed a direct bump test of 60 inch-pounds and an indirect bump test of 30 inch-pounds.

The aqueous resin solution was evaluated in can coating applications. A film prepared from the resin on tin plated steel was well cured after heating for 10 minutes at 400° F. The film exhibited very good adhesion, mar resistance, hardness, impact, boiling water resistance, and steam processing resistance. The film withstood can end fabrication well and had good wedge bend flexibility.

EXAMPLE 3

Using the same procedure as was described in Example 1, a resinous composition was prepared by reacting 58.75 parts of a butadiene/styrene copolymer (described in Example 1) with 20.42 parts of tall oil fatty acids, 15.33 parts of alkali refined linseed oil and 5.5 parts of fumaric acid. The resinous product had an acid value of 72.6, a density at 25° C. of 7.83 lbs./gallon and a Gardner-Holdt viscosity at 25° C. of $Z_6$–$Z_7$ at 60 percent solids in a highly aromatic hydrocarbon solvent having a boiling range of 313° F. to 398° F., and a minimum flash point of 100° F.

Using the procedure as was described in Example 1, an aqueous solution of the resinous reaction product was prepared using 40 parts of resinous reaction product, 4 parts of diethyl amine and 56 parts of water. The resulting solution had a pH of 8.6, a density at 25° C. of 8.15 lbs./gallon and a Gardner-Holdt viscosity at 25° C. of X to Y. Films on phosphate treated steel panels were prepared from the solutions using a 3 mil drawdown blade and were baked for 20 minutes at 350° F. The films had a pencil hardness of B and passed direct and indirect bump tests of 70 and 80 inch-pounds, respectively.

EXAMPLE 4

Using the same procedure as was described in Example 1, a resinous composition was prepared by reacting 50.35 parts of the butadiene/styrene copolymer described in Example 1 with 17.5 parts of tall oil fatty acids, 26.29 parts of alkali refined linseed oil and 5.86 parts of fumaric acid. The resulting product had an acid value of 73.5, a density at 25° C. of 7.88 and a Gardner-Holdt viscosity at 25° C. of G to H at 60 percent solids in a highly aromatic hydrocarbon solvent having a boiling range of 313° F. to 398° F., and a minimum flash point of 100° F.

An aqueous solution of the resinous product, prepared as described in Example 1 using 60 parts of resin, 4.2 parts of diethyl amine and 55.8 parts of water, had a pH of 9, a density at 25° C. of 8.16 lbs./gallon and a Gardner-Holdt viscosity at 25° C. of Y to Z. Films prepared from this solution were well cured after baking at 350° F. for 20 minutes, exhibiting good resistance to solvents and to boiling water.

EXAMPLE 5

Using the same procedure as was described in Example 1, a resinous composition was prepared by reacting 45 parts of the butadiene/styrene copolymer described in Example 1 with 30 parts of tall oil fatty acids, 20 parts of an unsaturated hydrocarbon resin which is a polymer of cyclopentadiene having a melting point of about 215° F., an iodine number of 180 and a specific gravity at 25° C. of 1.11, and 5 parts of fumaric acid. The resulting product had an acid value of 69, a density at 25° C. of 8.08 lbs./gallon and a Gardner-Holdt viscosity at 25° C. of $Z_{10}$ at 60 percent solids in the highly aromatic hydrocarbon resin described in Example 1.

The resinous reaction product was solubilized in water at 5 percent solids using 1.2 equivalents, based on acid content of the resin of 1,4 bis (2-hydroxypropyl) 2-methyl piperazine. This resin solution was placed in a metal container in which was suspended a steel panel. Electrodes were attached to the metal container and to the steel panel and a direct electric current was passed through the electrodes and the bath, the steel panel serving as the anode and the metal container as the cathode. After applying the electric current for 1 minute (150 volts with 0.95 amps initial current and 0.35 amps final current) a coating having an average thickness of 1.2 mils was plated out on the steel panel. After baking for 15 minutes at 385° F. the film was smooth, glossy and very hard.

EXAMPLE 6

Using the same procedure as described in Example 1, a resinous composition was made from 705 parts of the butadiene/styrene copolymer described in Example 1, 245 parts of tall oil fatty acids and 50 parts of fumaric acid. 125 parts of this reaction product were blended with 100 parts of an epoxide resin, the diglycidyl ether of p,p'-dihydroxydiphenyl propane having an epoxide equivalent weight of 190, 94 parts of dodecenyl succinic anhydride and 2.5 parts of diethylaminoethanol. The clear blend was poured into a mold and was cured by baking at 250° F. for 24 hours. The cured product had the following properties:

| | |
|---|---|
| Hardness, Shore D Scale | 53 |
| Tensile strength _____p.s.i__ | 1,321 |
| Tensile elongation _____percent__ | 54.1 |
| Izod impact strength _____ft. lbs./in. notch__ | 1.78 |
| Water absorption _____percent__ | 0.17 |
| Dielectric constant (1 megacycle) | 3.18 |
| Dissipation factor | 0.010 |
| Volume resistivity, ° F.: | |
| 77 | $3.4 \times 10^{15}$ |
| 150 | $4.4 \times 10^{13}$ |
| 200 | $9.2 \times 10$ |
| 266 | $4.9 \times 10^{10}$ |
| 302 | $1.7 \times 10^{10}$ |

It is to be understood that the foregoing detailed description is given merely by way of illustration and that many variations may be made therein without departing from the spirit of the invention.

The embodiments of the invention in which an exclusive property or privilege is claimed are defined as follows:

1. A coating composition comprising an aqueous solution of
   (I) a resinous reaction product formed by the concurrent reaction of (a) fumaric acid, (b) an unsaturated fatty compound which is an unsaturated fatty oil or an unsaturated fatty acid, and (c) an unsaturated polymeric compound which is a homopolymer of butadiene or a copolymer of butadiene and a vinyl aromatic monomer, wherein the copolymer contains at least 75 weight percent polymerized butadiene and wherein the reactants are in the weight proportions of 5 to 15 percent of (a), 5 to 55 percent of (b), and 40 to 80 percent of (c), the total being 100, and
   (II) a water soluble amine wherein about 0.5 to 1.5 equivalents of said amine are present for each carboxylic acid group of I.

2. The composition of claim 1 wherein the unsaturated fatty compound is tall oil fatty acids, the unsaturated polymeric compound is a copolymer of 80 weight percent butadiene and 20 weight percent styrene, said copolymer having a viscosity of about 3500 poises at 25° C., and an iodine number of about 300 and the amine is diethyl amine.

3. The composition of claim 1 wherein the unsaturated fatty compound is a mixture of unsaturated fatty acids and unsaturated fatty oil.

4. The composition of claim 3 wherein the fatty acids are tall oil fatty acids and the unsaturated fatty oil is linseed oil.

5. A cured film made from the composition of claim 1.

References Cited
UNITED STATES PATENTS

| | | | |
|---|---|---|---|
| 3,251,790 | 5/1966 | Christenson et al. | 260—23.7 |
| 3,258,437 | 6/1966 | Peters et al. | 260—22 |
| 3,305,501 | 2/1967 | Spaulding | 260—18 |

DONALD E. CZAJA, Primary Examiner

D. J. BARRACK, Assistant Examiner

U.S. Cl. X.R.

260—29.7, 876